(12) United States Patent
Spathias et al.

(10) Patent No.: US 11,512,609 B1
(45) Date of Patent: Nov. 29, 2022

(54) TURBOMACHINE WITH HOUSING CONTROL SURFACES FOR ALIGNING AIR BEARING COMPONENTS

(71) Applicant: Garrett Transportation I Inc., Torrance, CA (US)

(72) Inventors: Adonis Spathias, Glendora, CA (US); LienHuong Ho, Lomita, CA (US); Kristian Dullack, Torrance, CA (US)

(73) Assignee: GARRETT TRANSPORTATION I INC, Torrance, CA (US)

( * ) Notice: Subject to any disclaimer, the term of this patent is extended or adjusted under 35 U.S.C. 154(b) by 0 days.

(21) Appl. No.: 17/305,078

(22) Filed: Jun. 30, 2021

(51) Int. Cl.
*F01D 25/16* (2006.01)
*F02C 6/12* (2006.01)

(52) U.S. Cl.
CPC .............. *F01D 25/162* (2013.01); *F02C 6/12* (2013.01); *F05D 2220/40* (2013.01); *F05D 2220/76* (2013.01); *F05D 2230/60* (2013.01); *F05D 2240/53* (2013.01)

(58) Field of Classification Search
CPC ...... F01D 25/162; F02C 6/12; F05D 2220/40; F05D 2220/76; F05D 2230/60; F05D 2240/53
See application file for complete search history.

(56) References Cited

U.S. PATENT DOCUMENTS

| 4,460,284 | A | * | 7/1984 | Lauterbach | F01D 25/164 384/126 |
| 8,186,886 | B2 | | 5/2012 | McKeirnan, Jr. | |
| 2012/0306206 | A1 | * | 12/2012 | Agrawal | F04D 25/024 290/52 |
| 2015/0008771 | A1 | * | 1/2015 | Lee | H02K 9/06 310/62 |
| 2016/0097302 | A1 | * | 4/2016 | Svihla | F01D 11/02 417/407 |
| 2016/0130967 | A1 | * | 5/2016 | Kelly | F01D 11/003 415/174.5 |
| 2016/0265553 | A1 | | 9/2016 | Annati et al. | |
| 2016/0298535 | A1 | * | 10/2016 | Hettinger | F02B 39/14 |
| 2019/0211706 | A1 | * | 7/2019 | Arnold | F01D 25/125 |
| 2019/0218934 | A1 | * | 7/2019 | Naik | F16C 33/106 |
| 2020/0378436 | A1 | * | 12/2020 | Simard-Bergeron | F16C 43/02 |
| 2021/0310371 | A1 | * | 10/2021 | Spathias | F04D 29/4206 |

FOREIGN PATENT DOCUMENTS

| CN | 106968984 B | 10/2020 |
| EP | 3623597 A1 | 3/2020 |

* cited by examiner

*Primary Examiner* — Jesse S Bogue
(74) *Attorney, Agent, or Firm* — Lorenz & Kopf LLP

(57) ABSTRACT

A turbomachine includes a first housing member having a first journal bearing portion and a first radial control surface. The turbomachine also includes a second housing member with a second journal bearing portion and a second radial control surface. The second radial control surface has an interference fit with the first radial control surface that radially aligns the second journal bearing portion and the first journal bearing portion along a common axis.

13 Claims, 5 Drawing Sheets

TURBOMACHINE WITH HOUSING CONTROL SURFACES FOR ALIGNING AIR BEARING COMPONENTS

TECHNICAL FIELD

The present disclosure generally relates to a turbomachine and, more particularly, relates to a turbomachine with housing control surfaces for aligning air bearing components.

BACKGROUND

Various bearing systems are provided for supporting rotation of a shaft within a housing. For example, turbomachines (e.g., turbochargers, superchargers, turbocompressor devices, etc.) may include one or more air bearings (i.e., journal bearings or plain bearings). These bearings preferably support efficient rotation of the shaft, across a wide range of operating conditions, and throughout a long operating lifetime.

Turbomachines with air bearings may present a number of deficiencies. For example, it may be necessary to align the air bearing members along a common axis to high precision. Otherwise, excessive misalignment may reduce the load capacity of the bearing system. However, it may be difficult, time consuming, inefficient, and/or expensive to manufacture these turbomachines with sufficient alignment between the air bearing members. These problems may be exacerbated in a high-volume manufacturing environment.

Thus, it is desirable to provide a turbomachine with air bearing members that may be precisely aligned along a common axis in a more convenient and efficient manner. Other desirable features and characteristics of the present disclosure will become apparent from the subsequent detailed description and the appended claims, taken in conjunction with the accompanying drawings and this background discussion.

BRIEF SUMMARY

In one embodiment, a turbomachine is disclosed that includes a first housing member having a first journal bearing portion and a first radial control surface. The turbomachine also includes a second housing member with a second journal bearing portion and a second radial control surface. The second radial control surface has an interference fit with the first radial control surface that radially aligns the second journal bearing portion and the first journal bearing portion along a common axis.

In another embodiment, a method of manufacturing a turbomachine is disclosed. The method includes providing a first housing member with a first journal bearing portion and a first radial control surface. The method also includes providing a second housing member with a second journal bearing portion and a second radial control surface. Moreover, the method includes attaching the second housing member to the first housing member with an interference fit between the first radial control surface and the second radial control surface to radially align the second journal bearing portion and the first journal bearing portion along a common axis.

In an additional embodiment, a turbocharger is disclosed that includes a rotating group. The turbomachine also includes an e-machine operably coupled to the rotating group and operable as at least one of an electric motor and an electric generator. Furthermore, the turbocharger includes a housing that houses the rotating group and the e-machine. Moreover, the turbocharger includes an air bearing system that supports the rotating group for rotation within the housing about an axis of rotation. The housing includes a first housing member and a second housing member that cooperatively house the e-machine. The first housing member has a first journal bearing portion of the air bearing system and a first radial control surface. The second housing member has a second journal bearing portion of the air bearing system and a second radial control surface. The second radial control surface has an interference fit with the first radial control surface that radially aligns the second journal bearing portion and the first journal bearing portion along the axis of rotation.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Broadly, example embodiments disclosed herein include a turbomachine, such as a turbocharger, turbocompressor, etc. with features that facilitate alignment of air bearing components. The turbomachine may include a housing having a first member and a second member that include respective air bearing members. The first member and the second member may include respective radial control surfaces that are interference fit. The interference fit may be configured for aligning the air bearing members coaxially on an axis of rotation of the rotating group. Furthermore, the turbomachine may include at least one feature for controlling angular positioning of the housing. Moreover, the turbomachine may include one or more features for facilitating disassembly and re-assembly of the turbomachine housing.

Figure 1:
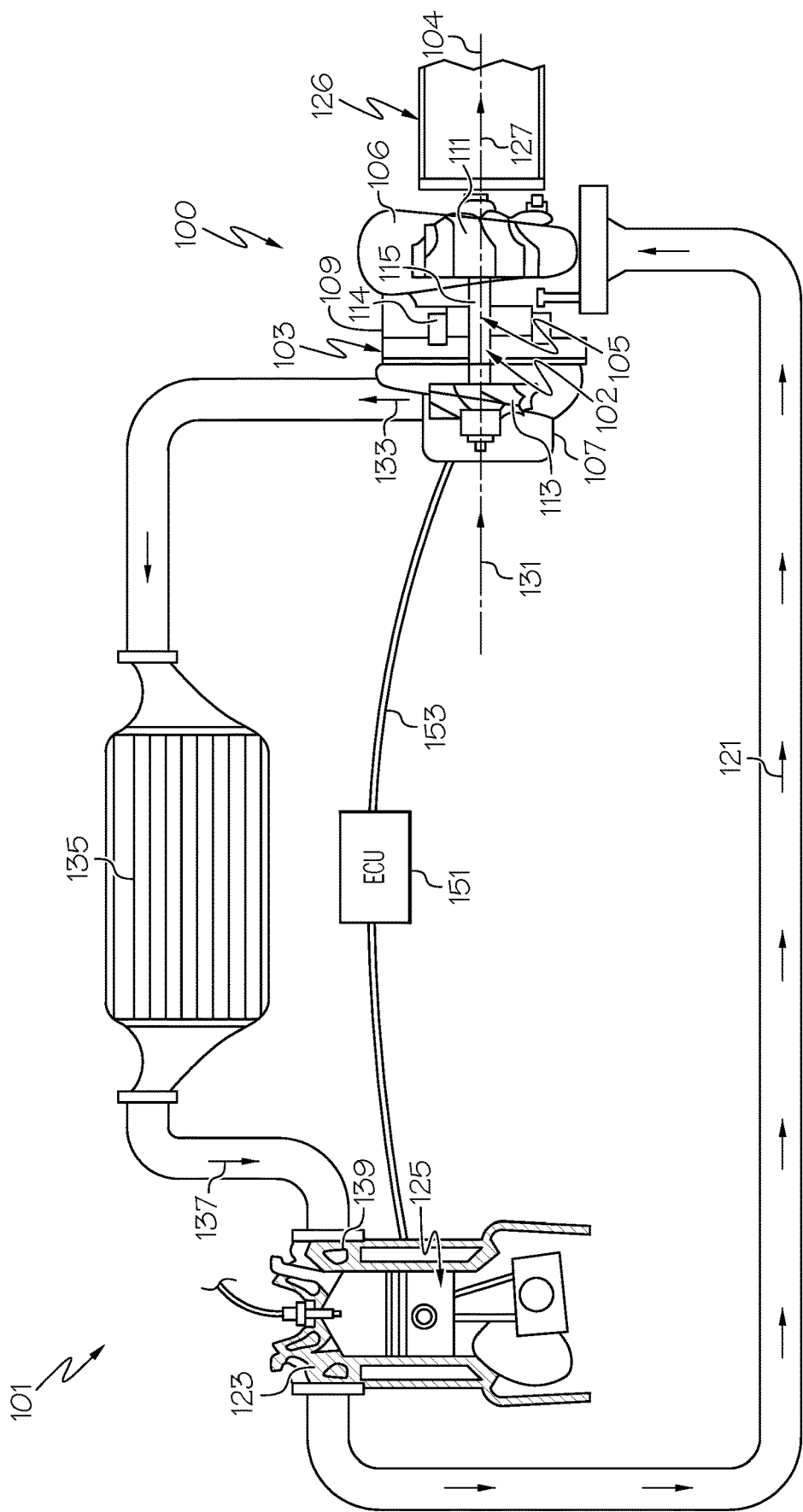
FIG. 1 is a schematic diagram of an engine system with a turbomachine according to example embodiments of the present disclosure.

FIG. 1 is a schematic view of an example turbomachine, such as a turbocharger 100 that is incorporated within an engine system 101. The turbocharger 100 may include one or more features of the present disclosure. It will be appreciated that the turbocharger 100 could be another turbomachine, such as a supercharger, a compressor device, an electric-motor-driven turbomachine, etc., in additional embodiments of the present disclosure. Furthermore, the turbomachine 100 of the present disclosure may be incorporated into a number of systems other than an engine system without departing from the scope of the present disclosure. For example, the turbomachine 100 may be incorporated within a fuel cell system and may be configured for delivering compressed air to a fuel cell stack in some embodiments.

The turbocharger 100 may include a housing 103 and a rotating group 102, which is supported within the housing 103 for rotation about an axis 104 by a bearing system 105. The bearing system 105 may include and/or define an air bearing system (journal bearing system, plain bearing system, etc.) as will be discussed.

As shown in the illustrated embodiment, the housing 103 may include a turbine housing 106, a compressor housing 107, and an intermediate housing 109. The intermediate housing 109 may be disposed axially between the turbine and compressor housings 106, 107.

Additionally, the rotating group 102 may include a turbine wheel 111, a compressor wheel 113, and a shaft 115. The turbine wheel 111 is located substantially within the turbine housing 106. The compressor wheel 113 is located substantially within the compressor housing 107. The shaft 115 extends along the axis of rotation 104 and through the intermediate housing 109, to connect the turbine wheel 111 to the compressor wheel 113. Accordingly, the turbine wheel 111 and the compressor wheel 113 rotate together as a unit about the axis 104.

The turbine housing 106 and the turbine wheel 111 cooperate to form a turbine (i.e., turbine section, turbine stage) configured to circumferentially receive a high-pressure and high-temperature exhaust gas stream 121 from an engine, e.g., from an exhaust manifold 123 of an internal combustion engine 125. The turbine wheel 111 and, thus, the other components of the rotating group 102 are driven in rotation around the axis 104 by the high-pressure and high-temperature exhaust gas stream 121, which becomes a lower-pressure and lower-temperature exhaust gas stream 127 that is released into a downstream exhaust pipe 126.

The compressor housing 107 and compressor wheel 113 form a compressor (i.e., compressor section, compressor stage). The compressor wheel 113, being driven in rotation by the exhaust-gas driven turbine wheel 111, is configured to compress received input air 131 (e.g., ambient air, or already-pressurized air from a previous-stage in a multi-stage compressor) into a pressurized airstream 133 that is ejected circumferentially from the compressor housing 107. The compressor housing 107 may have a shape (e.g., a volute shape or otherwise) configured to direct and pressurize the air blown from the compressor wheel 113. Due to the compression process, the pressurized air stream is characterized by an increased temperature, over that of the input air 131.

The pressurized airstream 133 may be channeled through an air cooler 135 (i.e., intercooler), such as a convectively cooled charge air cooler. The air cooler 135 may be configured to dissipate heat from the pressurized airstream 133, increasing its density. The resulting cooled and pressurized output air stream 137 is channeled into an intake manifold 139 of the internal combustion engine 125, or alternatively, into a subsequent-stage, in-series compressor. The operation of the system may be controlled by an ECU 151 (engine control unit) that connects to the remainder of the system via communication connections 153.

In some embodiments, the turbocharger 100 may include an e-machine 114. The e-machine 114 may be an electric motor in some embodiments for driving the rotating group 102 in rotation about the axis 104. In additional embodiments, the e-machine 114 may be configured as an electric generator for generating electricity from rotation of the rotating group 102. Furthermore, the e-machine 114 may be operable in some conditions as a motor and in other conditions as a generator. The e-machine 114 may be housed substantially within the intermediate housing 109.

Figure 2:
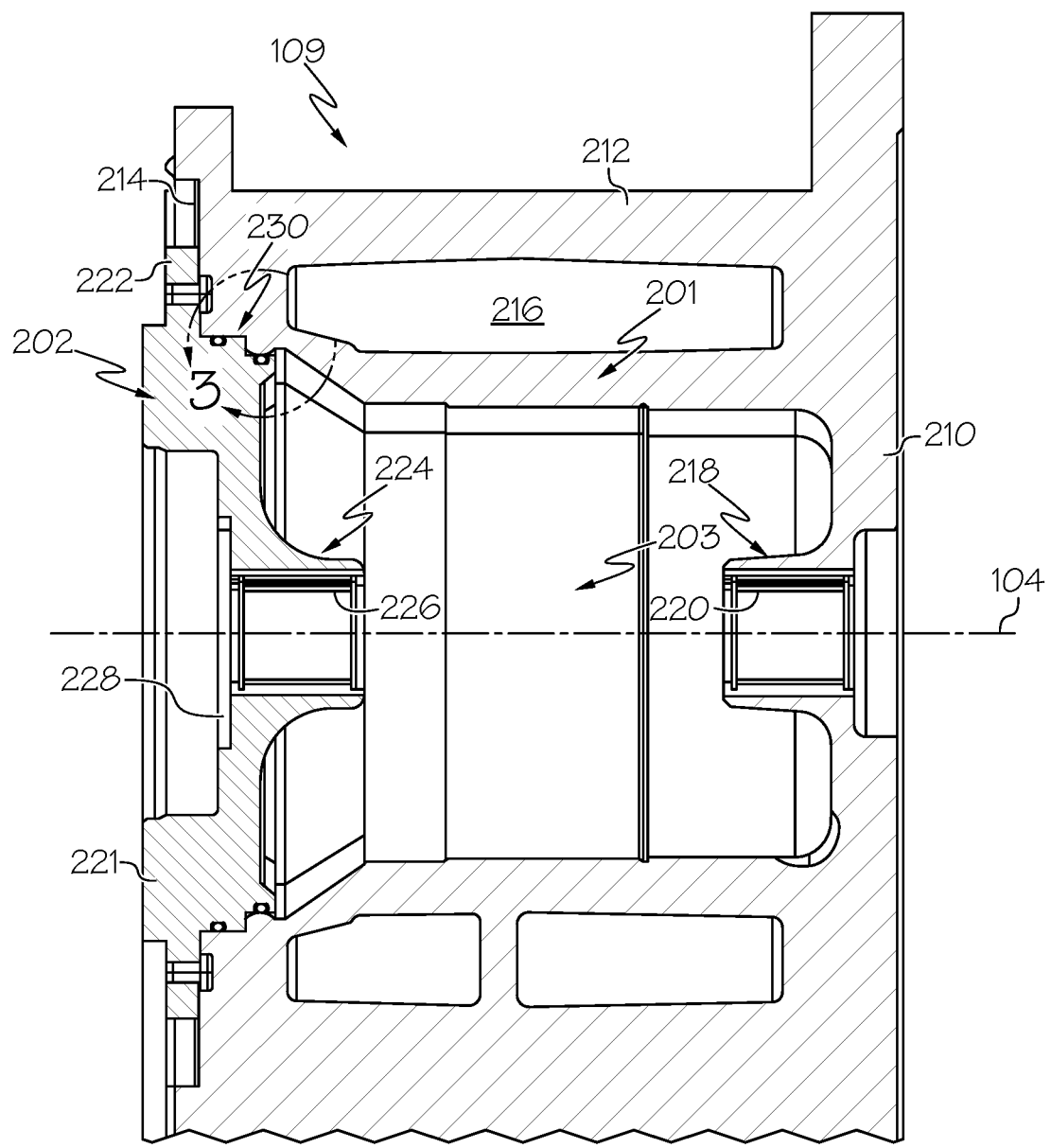
FIG. 2 is a cross sectional view of portions of a turbomachine housing according to example embodiments of the present disclosure.

Referring now to FIG. 2, the housing 103 of the turbocharger 100 will be discussed in greater detail according to example embodiments. In particular, portions of the intermediate housing 109 are shown according to example embodiments while other portions of the turbocharger 100 are hidden. As will be discussed, the intermediate housing 109 may be configured for housing the e-machine 114, and the intermediate housing 109 may define one or more portions/members of the bearing system 105.

In some embodiments, the intermediate housing 109 may generally include a motor housing member 201 (i.e., a first housing member) and a bearing housing member 202 (i.e., a second housing member). The motor housing member 201 and the bearing housing member 202 may be attached (e.g., removably attached) to cooperatively define an internal cavity 203 within the intermediate housing 109. The e-machine 114 (FIG. 1) may be housed within the cavity 203.

The motor housing member 201 may be a unitary, one-piece part that is made out of a strong and robust material, such as metal. The motor housing member 201 may include an axial wall 210, which extends substantially normal to the axis 104. The motor housing member 201 may also include a radial wall 212, which extends annularly about the axis 104, and which extends axially from one side of the axial wall 210. The radial wall 212 may also terminate at an end 214, which faces axially away from the axial wall 210. The end 214 may define an opening into the cavity 203. In some embodiments, the motor housing member 201 may also define one or more coolant channels 216 through which a fluid coolant may flow, for example, to cool the e-machine 114. The coolant channel(s) 216 may be defined within the radial wall 212 in some embodiments and may define a flow axis for coolant that extends at least partly about the axis 104.

The motor housing member 201 may also include a first journal bearing portion 218. The first journal bearing portion 218 may be cylindrical and hollow and may project axially from the axial wall 210 into the cavity 203. The first journal bearing portion 218 may include an inner diameter surface 220, which may be substantially centered about the axis 104. The first journal bearing portion 218 may receive the shaft 115 (FIG. 1). The diameter of the inner diameter surface 220 may be slightly larger than that of the shaft 115, such that a small radial gap is defined therebetween. During operation, a film of air within this gap may support rotation of the shaft 115 within the first journal bearing portion 218 against radially-directed loads.

The bearing housing member 202 may be a unitary, one-piece part that is made out of a strong and robust material, such as metal. The bearing housing member 202 may include a plate-like central portion 221 and an outer flange 222, which projects radially outward from the central portion 221 and the axis 104. The outer flange 222 may seat against and may abut against the end 214 of the motor housing member 201 such that the central portion 221 covers over the opening to the cavity 203.

The bearing housing member 202 may also include a second journal bearing portion 224. The second journal bearing portion 224 may be cylindrical and hollow and may project axially from the central portion 221 into the cavity 203. The second journal bearing portion 224 may include an inner diameter surface 226, which may be substantially centered about the axis 104. The second journal bearing portion 224 may receive the shaft 115 (FIG. 1). The diameter of the inner diameter surface 226 may be slightly larger than that of the shaft 115, such that a small radial gap is defined therebetween. During operation, a film of air within this gap may support rotation of the shaft 115 within the second journal bearing portion 224 against radially-directed loads.

Furthermore, the bearing housing member 202 may include a thrust bearing recess 228. The recess 228 may be an annular recess on the central portion 221, on the axial side opposite the second journal bearing portion 224. The thrust bearing recess 228 may be centered on the axis 104. The thrust bearing recess 228 may receive an annular thrust disc, which is fixed to the shaft 115, and an opposing housing member may cover over the other axial face of the thrust disc to encapsulate the thrust disc therebetween. During operation, a film of air between the thrust disc and the surfaces of the thrust bearing recess 228 (and between the thrust disc and the other opposing housing member) may support rotation of the thrust disc and shaft 115 by resisting axial thrust loads on the rotating group 102.

In some embodiments, the compressor housing 107, the compressor wheel 113, and other portions of the compressor section (FIG. 1) may be disposed proximate the outer face of the bearing housing member 202. Furthermore, the turbine housing 106, the turbine wheel 11, and other portions of the turbine section may be disposed proximate the outer face of the axial wall 210 of the motor housing member 201.

Figure 3:
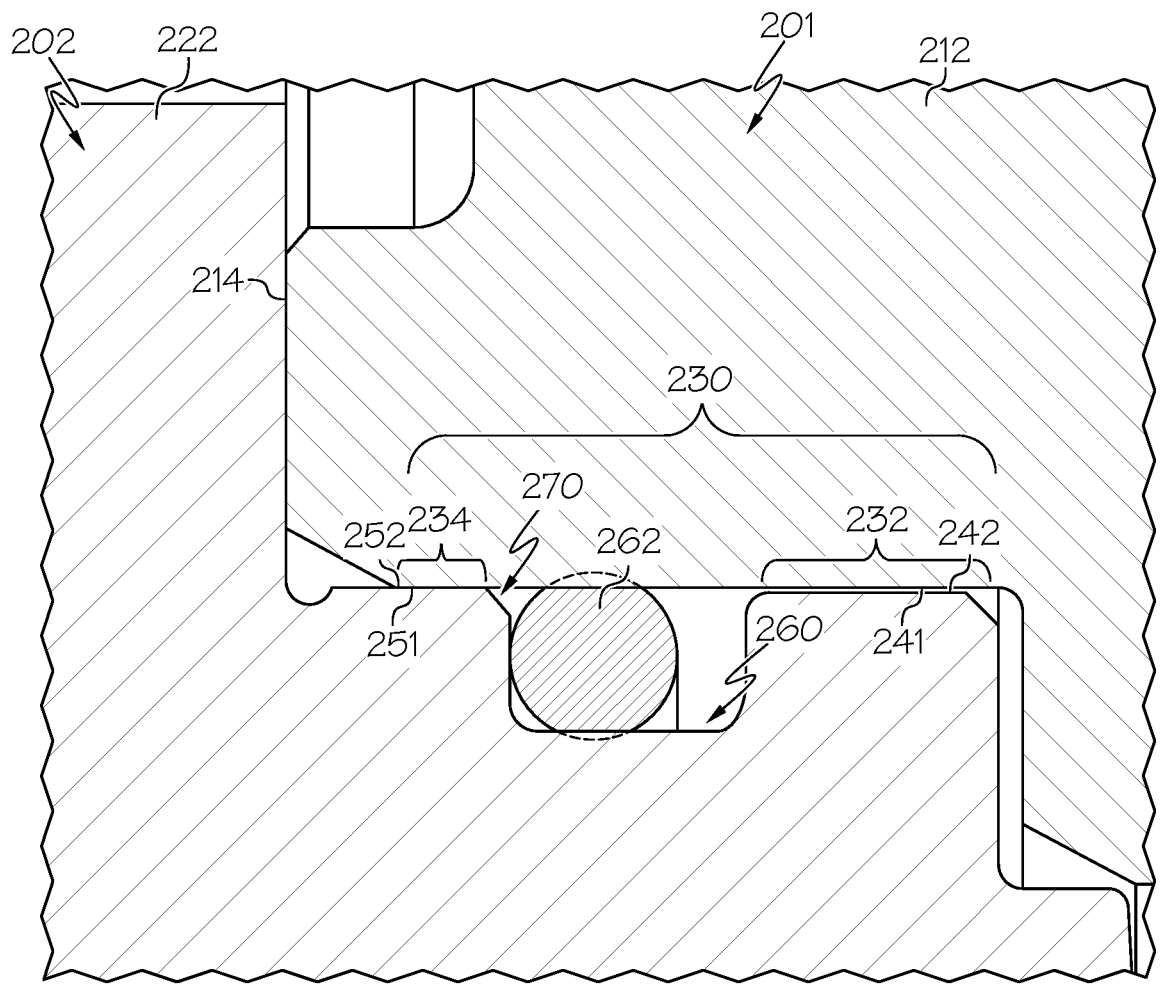
FIG. 3 is a cross sectional view of a portion of the turbomachine housing of FIG. 2.

The bearing housing member 202 may be fit together and fixedly attached at a radial interface 230, which is shown in detail in FIG. 3. In some embodiments, the radial interface 230 may be defined between an inner diameter surface of the motor housing member 201 and an outer diameter surface of the bearing housing member 202. As such, the motor housing member 201 may receive a portion of the bearing housing member 202 to establish and define the radial interface 230.

As shown in FIG. 3, the interface 230 may include a radial clearance fit portion 232 and an interference fit portion 234. More specifically, the motor housing member 201 may include a first clearance fit surface 241 that opposes a second clearance fit surface 242 of the bearing housing member 202 at the clearance fit portion 232. The first clearance fit surface 241 may be slightly larger in diameter than the second clearance fit surface 242, even when accounting for tolerancing. Moreover, the motor housing member 201 may include a first interference fit surface 251 that opposes a second interference fit surface 252 of the bearing housing member 202 at the interference fit portion 234. The first interference fit surface 251 and the second interference fit surface 252 may be manufactured to relatively high tolerances to ensure a desired fit. The first interference fit surface 251 may be slightly smaller in diameter than the second interference fit surface 252, even when accounting for tolerancing. The interference fit portion 234 may retain the bearing housing member 202 fixedly attached to the motor housing member 201. Also, the interference fit portion 234 may radially align the first and second journal bearing portions 218, 224 with the axis 104 so as to be substantially coaxial. In other words, the first interference fit surface 251 may define a first radial control surface for the intermediate housing 109, the second interference fit surface 252 may define a second radial control surface for the intermediate housing 109, and the interference fit portion 234 defined by these radial control surfaces may radially align the first and second journal bearing portions 218, 224. The control surfaces may be manufactured to relatively high tolerances such that the journal bearing portions 218, 224 are precisely aligned.

It will be appreciated that the term "interference fit" as used in relation to the interference fit portion 234 should be interpreted broadly to include a so-called transitional fit. As such, the surfaces 251, 252 may be formed such that there is interference that can be overcome, for example, by using a press during assembly.

In some embodiments, the bearing housing member 202 may further include an annular groove 260. The groove 260 may be disposed axially between the second clearance fit surface 242 and the second interference fit surface 252. The groove 260 may receive a sealing member 262, such as a resilient O-ring, for creating a radial seal between the motor housing member 201 and the bearing housing member 202.

Moreover, the bearing housing member 202 may include a ramp surface 270 on one axial side of the second interference fit surface 252. The ramp surface 270 may gradually increase in diameter and define a transition from the groove 260 to the second interference fit surface 252. Thus, the ramp surface 270 may be disposed axially between the second clearance fit surface 242 and the second interference fit surface 252.

Figure 4:
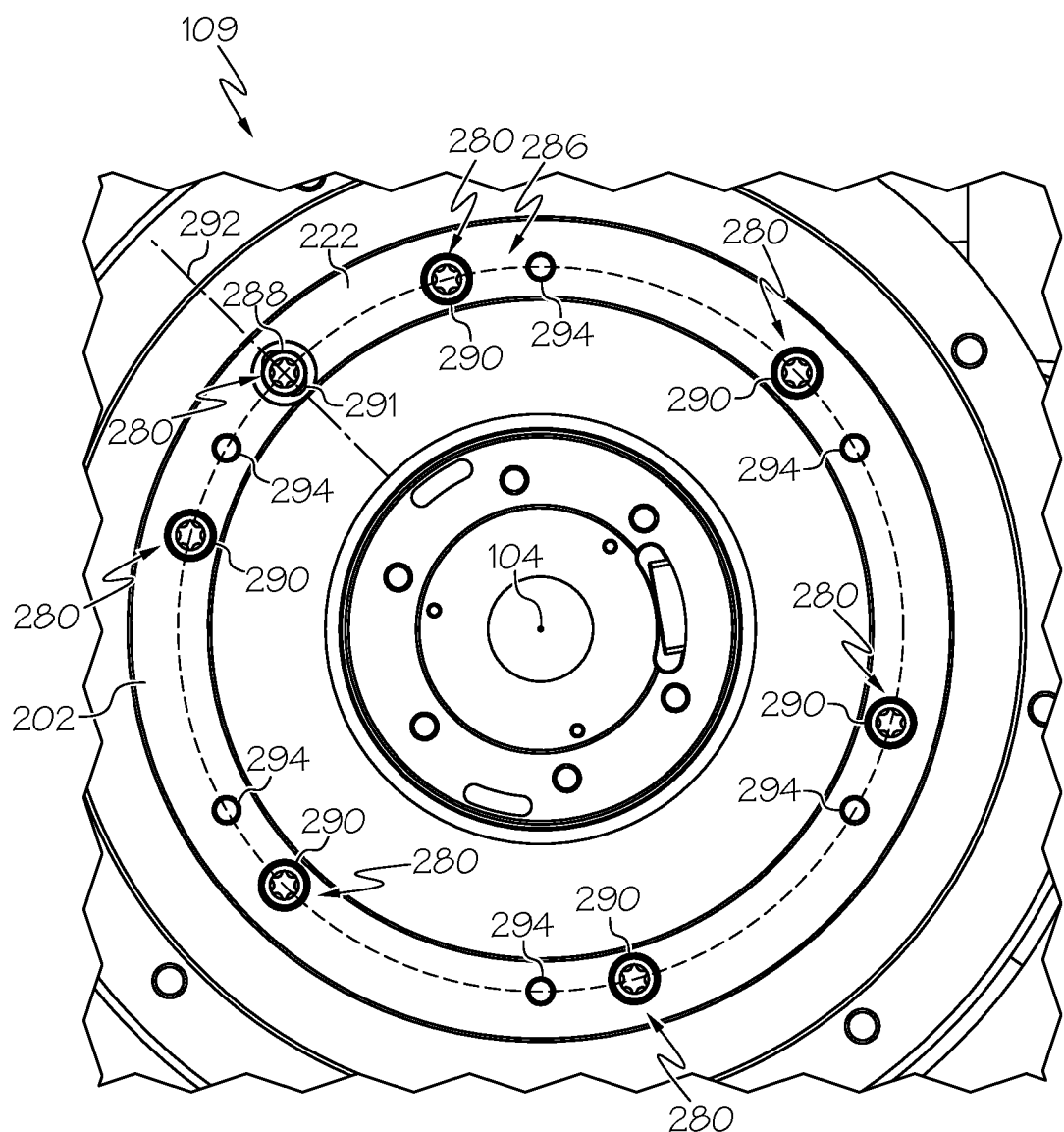
FIG. 4 is an end view of the turbomachine housing of FIG. 2.
Figure 5:
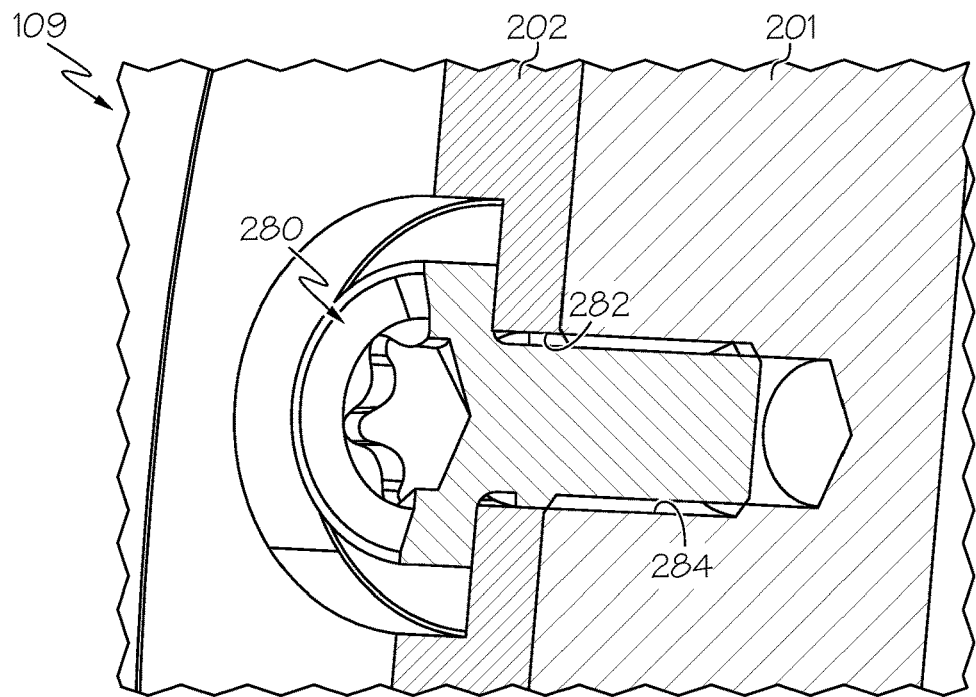
FIG. 5 is a sectional isometric view of a portion of the turbomachine housing of FIG. 2.

Additionally, as shown in FIGS. 4 and 5, the intermediate housing 109 may include at least one fastener 280 that is configured to fasten the bearing housing member 202 to the motor housing member 201. As shown in FIG. 4, there may be a plurality of such fasteners 280 (e.g., seven fasteners 280), and the fasteners 280 may be spaced apart angularly about the axis 104. At least one of the fasteners 280 may be and/or include a threaded bolt. As shown in FIG. 5, the fasteners 280 may extend through a respective flange aperture 282 in the flange 222 of the bearing housing member 202 to threadably engage a respective threaded aperture 284 in the motor housing member 201. Thus, the plurality of fasteners 280, flange apertures 282, and threaded apertures 284 may collectively define a bolt pattern 286 that attaches the bearing housing member 202 to the motor housing member 201.

In some embodiments, the bolt pattern 286 may include at least one angular control member 288 that controls the angular positioning of the bearing housing member 202 relative to the axis 104 and the motor housing member 201. As represented in FIG. 4, there may be a single angular control member 288 within the bolt pattern 286. This angular control member 288 may include at least one aperture that receives the respective fastener 280 and that is manufactured to relatively high tolerances for precisely controlling angular positioning of the bearing housing member 202. Others within the bolt pattern 286 (i.e., fastening members 290) may include apertures that are manufactured to lower tolerances for increasing manufacturing efficiency.

More specifically, at the fastening members 290 of the bolt pattern 286, the flange aperture 282 may be a circular aperture (FIGS. 4 and 5). In contrast, the flange aperture 282 of the angular control member 288 may be an elongate slot 291 (FIG. 4). The slot 291 may have a major axis 292 that intersects and radiates relative the axis 104. Inner surfaces of the slot 291 (i.e., angular control surfaces of the slot 291 that face tangentially) may be formed to higher tolerances than the flange apertures 282 of the fastening members 290. Thus, the fastener 280 of the angular control member 288 may be received within the slot 291 and threaded within the respective aperture 284. The fastener 280 of the angular control member 288 may abut the inner surfaces of the slot 291, and this may position the bearing housing member 202 at a known angular position relative to the axis 104 and relative to the motor housing member 201. The remaining fasteners 280 may be received in the respective flange aperture 282 and threaded aperture 284 to further attach the bearing housing member 202 to the motor housing member 201.

Accordingly, during assembly of the turbocharger 100, the e-machine 114 (FIG. 1) may be inserted into the motor housing member 201 with the shaft 115 extending through the first journal bearing portion 218. Then, the bearing housing member 202 may be placed upon the motor housing member 201 with the other end of the shaft 115 extending through the second journal bearing portion 224. A press may be used to advance the bearing housing member 202 into the motor housing member 201 to the position shown in FIGS. 2 and 3. Specifically, the ramp surface 270 may abut the surface 251, and further advancement of the bearing housing member 202 may create the interference fit between the surfaces 251, 252. As stated, the surfaces 251, 252 may be formed to relatively high tolerances. As such, this interference fit may coincidentally align the surfaces 220, 226 of the first and second journal bearing portions 218, 224 to be substantially concentric with the axis 104.

Figure 6:
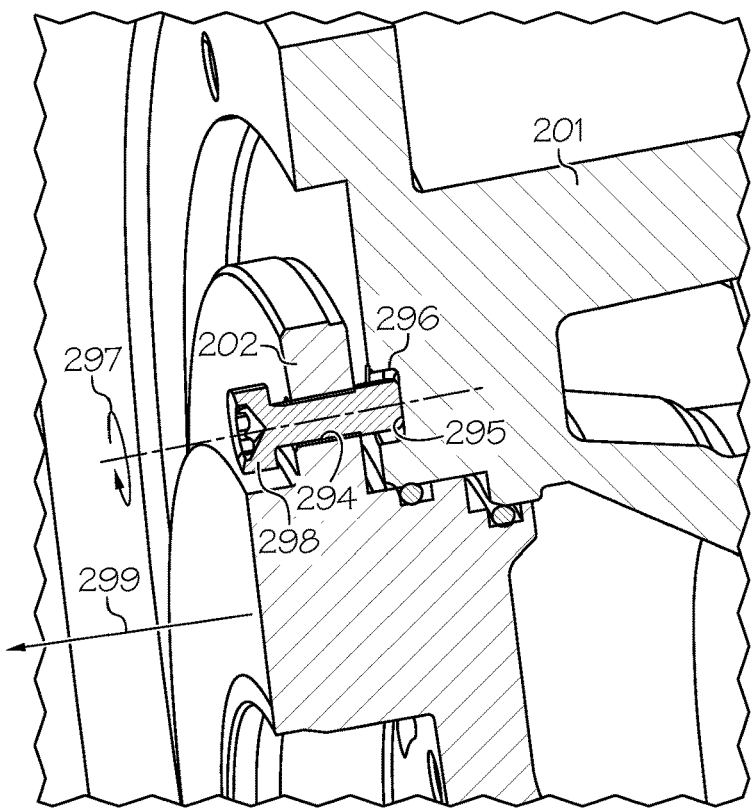
FIG. 6 is a sectional isometric view of a portion of the turbomachine housing of FIG. 2.

Moreover, as shown in FIG. 4, the bearing housing member 202 may include one or more jack apertures 294. There may be a plurality of jack apertures 294 spaced angularly about the flange 222. The jack apertures 294 may be threaded, circular holes in the flange 222. The jack apertures 294 may be configured to receive a jack fastener 298 as shown in FIG. 6. Also, the motor housing member 201 may include one or more recesses 296. The recesses 296 may be axially aligned with respective ones of the jack apertures 294. The recesses 296 may include an internal surface 295 that is recessed axially from the end 214 of the motor housing member 201.

The jack fasteners 298 may be used to overcome the interference fit when removing the bearing housing member 202 from the motor housing member 201. Specifically, as shown in FIG. 6, the jack fasteners 298 may be threadably advanced into the jack apertures 294 as represented by arrow 297. The internal end of the jack fastener 298 may be received in the respective recess 296 and may abut and rotate against the internal surface 295 thereof. Rotation of the jack fastener 298 may back the bearing housing member 202 axially away from the motor housing member 201 as represented by arrow 299 in FIG. 6. It will be appreciated that if the jack fastener 298 mars the internal surface 295, such marring will not affect later re-installation of the bearing housing member 202. Indeed, even if the internal surface 295 is marred, the bearing housing member 202 can still mate against the motor housing member 201, and the surface 295 remains recessed and spaced away from the bearing housing member 202. Thus, the bearing housing member 202 may be attached (via the bolt pattern 286), removed (via the jack fasteners 298), and later replaced (via the bolt pattern 286). This process may be repeatedly for testing, repair, and/or for other uses of the turbocharger 100.

Accordingly, the turbocharger 100 may be assembled and the journal bearing portions 218, 224 may be aligned conveniently and with precision. The turbocharger 100 may also be manufactured efficiently, even in high-volume manufacturing scenarios. Additionally, the turbocharger 100 may be disassembled and re-assembled conveniently, accurately, and repeatably.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It is understood that various changes may be made in the function and arrangement of elements described in an exemplary embodiment without departing from the scope of the present disclosure as set forth in the appended claims.

What is claimed is:

1. A turbomachine comprising:
 a first housing member having a first journal bearing portion and a first radial control surface;
 a second housing member with a second journal bearing portion and a second radial control surface, the second radial control surface having an interference fit with the first radial control surface that radially aligns the second journal bearing portion and the first journal bearing portion along a common axis, wherein the first housing member includes a first aperture, and wherein the second housing member includes a second aperture with an angular control surface;
 further comprising a fastener that is received in the first aperture and the second aperture and that engages the angular control surface to angularly position the second housing member at a predetermined angular position with respect to the common axis and with respect to the first housing member; and
 wherein the second aperture is a slot with a major axis that radiates relative to the common axis.

2. The turbomachine of claim 1, wherein the second housing member includes a ramp surface on one axial side of the second radial control surface.

3. The turbomachine of claim 2, wherein the second housing member includes a clearance fit surface, the ramp surface being disposed axially between the clearance fit surface and the second radial control surface, the clearance fit surface having a clearance fit with the first housing member.

4. The turbomachine of claim 1, wherein the first radial control surface is an inner diameter surface, and the second radial control surface is an outer diameter surface.

5. A turbomachine comprising:
 a first housing member having a first journal bearing portion and a first radial control surface;
 a second housing member with a second journal bearing portion and a second radial control surface, the second radial control surface having an interference fit with the first radial control surface that radially aligns the second journal bearing portion and the first journal bearing portion along a common axis, wherein the first housing member includes a first aperture, and wherein the second housing member includes a second aperture with an angular control surface;
 further comprising a fastener that is received in the first aperture and the second aperture and that engages the angular control surface to angularly position the second housing member at a predetermined angular position with respect to the common axis and with respect to the first housing member; and
 further comprising a plurality of fastening apertures and a plurality of attachment fasteners, the plurality of attachment fasteners received in corresponding ones of the fastening apertures; and
 wherein the second aperture has higher tolerancing as compared to the fastening apertures.

6. The turbomachine of claim 5, wherein the second housing member includes a ramp surface on one axial side of the second radial control surface.

7. The turbomachine of claim 6, wherein the second housing member includes a clearance fit surface, the ramp surface being disposed axially between the clearance fit surface and the second radial control surface, the clearance fit surface having a clearance fit with the first housing member.

8. The turbomachine of claim 5, wherein the first radial control surface is an inner diameter surface, and the second radial control surface is an outer diameter surface.

9. A turbomachine comprising:
   a first housing member having a first journal bearing portion and a first radial control surface;
   a second housing member with a second journal bearing portion and a second radial control surface, the second radial control surface having an interference fit with the first radial control surface that radially aligns the second journal bearing portion and the first journal bearing portion along a common axis, wherein the first housing member includes a first aperture, and wherein the second housing member includes a second aperture with an angular control surface;
   further comprising a fastener that is received in the first aperture and the second aperture and that engages the angular control surface to angularly position the second housing member at a predetermined angular position with respect to the common axis and with respect to the first housing member; and
   wherein the second housing member includes a jack aperture configured to receive a jack fastener that advances in the jack aperture to overcome the interference fit and remove the second housing member from the first housing member.

10. The turbomachine of claim 9, wherein the first housing member includes a first axial surface and the second housing member includes a second axial surface that faces in an opposite axial direction from the first axial surface;
    wherein the first housing member includes a recess with an inner surface that is recessed from the first axial surface; and
    wherein the inner surface is configured to abut against the jack fastener.

11. The turbomachine of claim 9, wherein the second housing member includes a ramp surface on one axial side of the second radial control surface.

12. The turbomachine of claim 11, wherein the second housing member includes a clearance fit surface, the ramp surface being disposed axially between the clearance fit surface and the second radial control surface, the clearance fit surface having a clearance fit with the first housing member.

13. The turbomachine of claim 9, wherein the first radial control surface is an inner diameter surface, and the second radial control surface is an outer diameter surface.

* * * * *